(12) United States Patent
Mori

(10) Patent No.: US 9,464,704 B2
(45) Date of Patent: Oct. 11, 2016

(54) ACTUATOR

(71) Applicant: NIPPON THOMPSON CO., LTD., Tokyo (JP)

(72) Inventor: Junya Mori, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/710,917

(22) Filed: May 13, 2015

(65) Prior Publication Data
US 2015/0377330 A1 Dec. 31, 2015

(30) Foreign Application Priority Data

Jun. 26, 2014 (JP) ................................ 2014-131836

(51) Int. Cl.
| | | |
|---|---|---|
| F16H 3/06 | (2006.01) | |
| F16H 25/22 | (2006.01) | |
| F16H 57/04 | (2010.01) | |
| F16H 25/20 | (2006.01) | |

(52) U.S. Cl.
CPC ...... F16H 25/2214 (2013.01); F16H 57/0406 (2013.01); *F16H 2025/204* (2013.01)

(58) Field of Classification Search
CPC ........... F16H 25/2204; F16H 57/0497; F16H 57/042; F16H 57/0467; F16C 29/02; F16C 29/004; F16C 29/0604
USPC ....... 74/89.23, 89.33, 89.44, 424.82, 424.88; 384/13, 45, 43
See application file for complete search history.

(56) References Cited

U.S. PATENT DOCUMENTS

| | | | | |
|---|---|---|---|---|
| 5,615,955 A * | 4/1997 | Namimatsu | ......... | F16C 33/3713 384/13 |
| 5,690,431 A * | 11/1997 | Schon | .................. | B23Q 11/085 384/15 |
| 5,749,266 A * | 5/1998 | Tsukada | ............... | F16C 29/0642 384/13 |
| 6,149,307 A * | 11/2000 | Kamimura | ............... | B23Q 1/40 384/13 |
| 6,344,718 B1 * | 2/2002 | Nagai | ....................... | B23Q 1/58 310/80 |
| 6,446,520 B1 * | 9/2002 | Nagai | ..................... | F16H 25/24 205/213 |
| 6,626,571 B2 * | 9/2003 | Kato | ..................... | F16C 29/082 384/15 |
| 6,655,225 B1 * | 12/2003 | Nagai | ................... | F16C 29/008 74/89.33 |
| 7,146,870 B2 * | 12/2006 | Kuo | .................... | F16C 29/0633 184/105.3 |
| 7,278,332 B2 * | 10/2007 | Nakatani | ............. | F16C 29/0638 384/13 |

(Continued)

FOREIGN PATENT DOCUMENTS

| | | |
|---|---|---|
| JP | 2002147561 A | 5/2002 |
| JP | 2010138981 A | 6/2010 |

*Primary Examiner* — William Kelleher
*Assistant Examiner* — Zakaria Elahmadi
(74) *Attorney, Agent, or Firm* — Browdy and Neimark, PLLC

(57) ABSTRACT

An actuator is composed of a frame having a guide rail thereon and a slider movable relative to the frame by means of a ball lead screw. Lubrication of the ball lead screw is carried out by a lubricating member installed in the slider. A first lubricating member has an applicator nose which comes into sliding contact with a helical groove around the ball lead screw and a second lubricating member makes close contact with the first lubricating member to supply lubricant to the first lubricating member. The first and second lubricating members fit together in a recess made at one end of the slider major body. Both the first and second lubricating members have C-shaped contour. The first and second lubricating members lying in close engagement with each other are received in a recess in the end of the slider major body and held there with a presser plate which is secured using fastening screws.

5 Claims, 14 Drawing Sheets

(56) References Cited

U.S. PATENT DOCUMENTS

| | | | | |
|---|---|---|---|---|
| 7,448,134 B2* | 11/2008 | Nagai | F16C 29/005 | 148/607 |
| 7,520,191 B2* | 4/2009 | Nagai | F16C 29/02 | 74/89.33 |
| 7,870,935 B2* | 1/2011 | Yatsushiro | F16H 19/025 | 184/9 |
| 8,028,595 B2* | 10/2011 | Wang | A47C 20/041 | 74/89.33 |
| 8,272,286 B2* | 9/2012 | Aso | F16C 29/082 | 277/650 |
| 8,925,408 B2* | 1/2015 | Sakai | F16H 25/2204 | 74/89.33 |
| 8,973,452 B2* | 3/2015 | Fukano | F16H 25/20 | 318/432 |
| 2002/0056333 A1* | 5/2002 | Ohya | F16H 25/2418 | 74/424.81 |
| 2003/0098551 A1* | 5/2003 | Kato | B23Q 1/58 | 277/650 |
| 2010/0139426 A1* | 6/2010 | Mori | F16C 29/004 | 74/89.32 |
| 2010/0206104 A1* | 8/2010 | Pfister | F16C 29/0604 | 74/89.44 |
| 2011/0254233 A1* | 10/2011 | Mori | F16N 21/00 | 277/634 |

* cited by examiner

ACTUATOR

FIELD OF THE INVENTION

The present invention relates to an actuator adapted for the use in a variety of machinery including assembling machines, measurement instruments, semiconductor manufacturing equipments, and so on. More especially, the present invention is concerned with an actuator composed of an elongated frame to provide a guide rail, a slider allowed to move relative to the frame, and a driving unit to energize the slider.

BACKGROUND OF THE INVENTION

Actuators adapted for the sliding means to move and guide linearly any object are recently availed in extensively increased fields. Modern actuators are needed to be less in weight as well as in height in transverse section, and more compact in construction. The actuators of the sorts as stated earlier have been used in means to do reciprocating motion, for example, in assembling machines, measurement instruments, various machines, industrial robots, semiconductor manufacturing equipments, and so on.

Disclosed in the commonly assigned Japanese Laid-Open Patent Application No. 2002-147 561 a ball screw device in which the lubricating means is attached to one end of the ball screw nut. The lubricating means is composed of which is composed of holder to fit detachably over a wiper seal and more than one lubricating plates stowed in the holder. The lubricating plate has a C-shaped contour in front view and a tongue coming into sliding engagement with a helical groove around the ball screw to apply lubricant to the helical groove. The lubricating plate is made of porous compact of sintered resinous material, which has a polarity of open-pores or open-cells impregnated with a plenty of lubricant.

The commonly-assigned Japanese Laid-Open Patent Application No. 2010-138 981 discloses an actuator composed of an elongated frame and a slider both of which are made of light alloy and made with dovetail grooves into which guide rail members of stainless steel fit to provide load-carrying races. Thus, the actuator is made light weight and compact in construction. With the actuator constructed as stated earlier, both the frame and the slider are made of extruded shapes of light-metal alloy and the first guide rail members may be attached to the frame with simple structure. Upper sealing members are placed between the frame and the slider. The frame is made an elongated extrusion of U-shape in transverse section whose side walls have first recesses of dovetail configuration to fit over first rail members and flanges. A slider has therein the slider body having second recesses of rectangular shape to fit over second rail members. There is further provided a driving unit to force the slider with respect to the frame. The first rail members each have the wedged configuration including tapered contours and dents, while the second rail members each have the rectangular shape.

With the prior ball screw device with lubricating means recited earlier, as nut is combined with the holder which contained therein the lubricating plates, the nut is inevitably made longer by the lubricating plates in the overall length and correspondingly the stroke length of the slider is restricted. With the prior actuator recited later, the actuator composed of an elongated frame and a slider, though weighing less, is made larger or bulky in construction. Advanced actuator designed to move unidirectionally is increasingly made lighter in weight as well as more compact in construction and more inexpensive than ever. Moreover, the advanced actuator in addition to compact in construction is needed to accomplish maintenance-free lubrication, less height in transverse section, and simple and inexpensive in construction.

SUMMARY OF THE INVENTION

The present invention, therefore, has as its principal object to overcome the problems stated earlier and, in particular, to provide an actuator adapted for the use in a variety of machinery including assembling machines, measurement instruments, semiconductor manufacturing equipments, and so on. The major concept of the present invention is to provide the actuator that has a frame to be fastened to base including a machine bed and so on, and a slider to move any object mounted thereon unidirectionally relatively to the base. Another concept of the present invention is to provide an actuator weighing less, compact in construction, inexpensive in production, and helping get the overall machine slimmer than ever. The actuator of the present invention features that the lubricating means for the ball screw unit without installing in the nut is provided in the slider of the linear motion guide unit to lubricate the helical groove around the ball screw. Moreover, the tubular porous compact impregnated with lubricant fits into the through-hole made in the slider to make the return passage, thereby making lubrication of the linear motion guide unit to carry out maintenance-free lubrication.

The present invention is concerned with an actuator comprising: an elongated frame of U-shape in transverse section defined with a bottom and a pair of side walls extending along widthwise opposing edges of the bottom, a slider lying between the side walls of the elongated frame in a way moving lengthwise of the side walls by means of more than one ball of first rolling element, and a driving unit to move the slider relatively to the frame, wherein the slider is composed of a slider major body having second raceway grooves lying on widthwise opposite sides of the slider major body to extend lengthwise of the slider major body and bores extending in parallel with the second raceway grooves, end caps secured to fore and aft ends of the slider major body, the end caps each having turnaround passages connecting the return passages with load-carrying races each of which is defined between each respective first raceway groove and each respective second raceway groove, so that more than one first rolling element is allowed to roll through a circulating circuit made up of the load-carrying race, return passage and the turnaround passages, wherein the driving unit has a ball screw composed of a ball lead screw round in transverse section and a nut mating with the ball lead screw through second balls, and nut is secured to a cavity of a cylindrical nut receiver formed at one end of the slider major body, wherein a first lubricating member and a second lubricating member are installed in a cylindrical recess formed at other end of the slider major body, the first lubricating member having an applicator nose coming into sliding contact with a helical groove of the ball lead screw and the second lubricating member supplying the lubricant to first lubricating member, and wherein the first lubricating member and the second lubricating member are secured in the cylindrical recess by means of a presser plate secured to an edge surface of the slider major body by fastening screws.

In the present invention, the first lubricating member and the second lubricating member have a C-shaped contour cut off at lower locations, so that the first lubricating member and the second lubricating member after having straddled the lead screw undergo elastic deformation to make less or more an interval or space lying between cut edges of the lubricating member, whereby the lubricating member is mounted or demounted from the cylindrical recess in the slider major body. Moreover, the C-shaped contour of the first lubricating member and the second lubricating member is designed to have outer circular surfaces, inner circular upper surfaces and inner linear lower surfaces extending between the inner circular upper surfaces and lower cut edges, and the first lubricating member and the second lubricating member, when suffered to elastic deformation, are allowed to mount on or demount from the ball lead screw. The first lubricating member has a thickness determined depending on a width of the helical groove on the lead screw while the second lubricating member has a thickness which is greater than the first lubricating member correspondingly a depth of the cylindrical recess in the slider major body.

In the present invention, the sleeve inserted in the bore in the slider major body, the first lubricating member and the second lubricating member are made of porous compact, which is made of fine powdery synthetic resinous material of polyethylene or polypropylene which is molded at elevated temperature while compacted into a porous or cellular structure in which the pores are open to each other through interstices among the fused particles, and lubricant retained in the pores or cells in the porous structure. Moreover, the driving unit has a motor mounted on a motor bracket fastened to the frame or bed to drive the ball lead screw, the motor rotating the ball lead screw through a coupling received in the motor bracket, and the ball lead screw is supported for rotation by means of an end bracket of the frame.

In the present invention, the side walls of the frame have first recesses of dovetail configuration extending lengthwise of the frame to fit over first rail members having first raceway groove and widthwise opposite sides of the slider major body have second recesses to fit over second rail members having second raceway grooves.

In the present invention, the end caps are arranged in pairs to lay the ball lead screw between the end caps in such a way lying on the end of the slider major body sidewise separated from each other and end seals are placed on the end caps, and the end seals have lubrication ports. Moreover, the ball lead screw extends the through-hole lying midway between sidewise opposite edges of the slider major body and the cylindrical recess is countersunk around the through-hole at the end of the slider major body. The cavity of the cylindrical nut receiver formed in the slider major body is made larger in diameter than the through-hole and an upper surface of the slider major part has a mounting surface to fasten the counterparts thereto.

EFFECT OF THE INVENTION

With the actuator constructed as stated earlier, the lubricating means composed of the first lubricating member and the second lubricating member to lubricate the ball lead screw serving as the driving means to move back and forth the slide is stowed into the cylindrical recess at the end of the slider major body, instead of installed in the nut of the ball lead screw built in the slider. Thus, as the result that the lubricating member may be made larger in volume, compared with the prior lubricating member built in the nut, the lubricating member is impregnated with a plenty amount of lubricant, helping realize maintenance-free lubrication.

Moreover, as the first and second lubricating members are stowed in the cylindrical recess at the end of the slider major body, the conventional holder parts to stow the lubricating members becomes unnecessary and, correspondingly, the amount of stroke of the slider is allowed to increases, the number of needed parts is reduced. Thus, the cost savings would be achieved and the space reserved for the disused parts may be availed for any parts other than the lubricating members. The first and second lubricating members of C-shaped contour stowed in the end of the slider major body may be mounted and demounted from the slider major body even if after assemblage or easily exchanged. Moreover, the lubricating members may be detected by appearances about the situation of lubricant impregnated in the lubricating members to help improve the maintenance efficiency. Moreover, the first lubricating member with applicator nose, because of placed nearer to the open edge of the cylindrical recess, may be easily confirmed whether coming into firm engagement with the helical groove of the ball lead screw and further easy for assemblage.

DETAILED DESCRIPTION OF THE PREFERRED EMBODIMENTS

Figure 1:
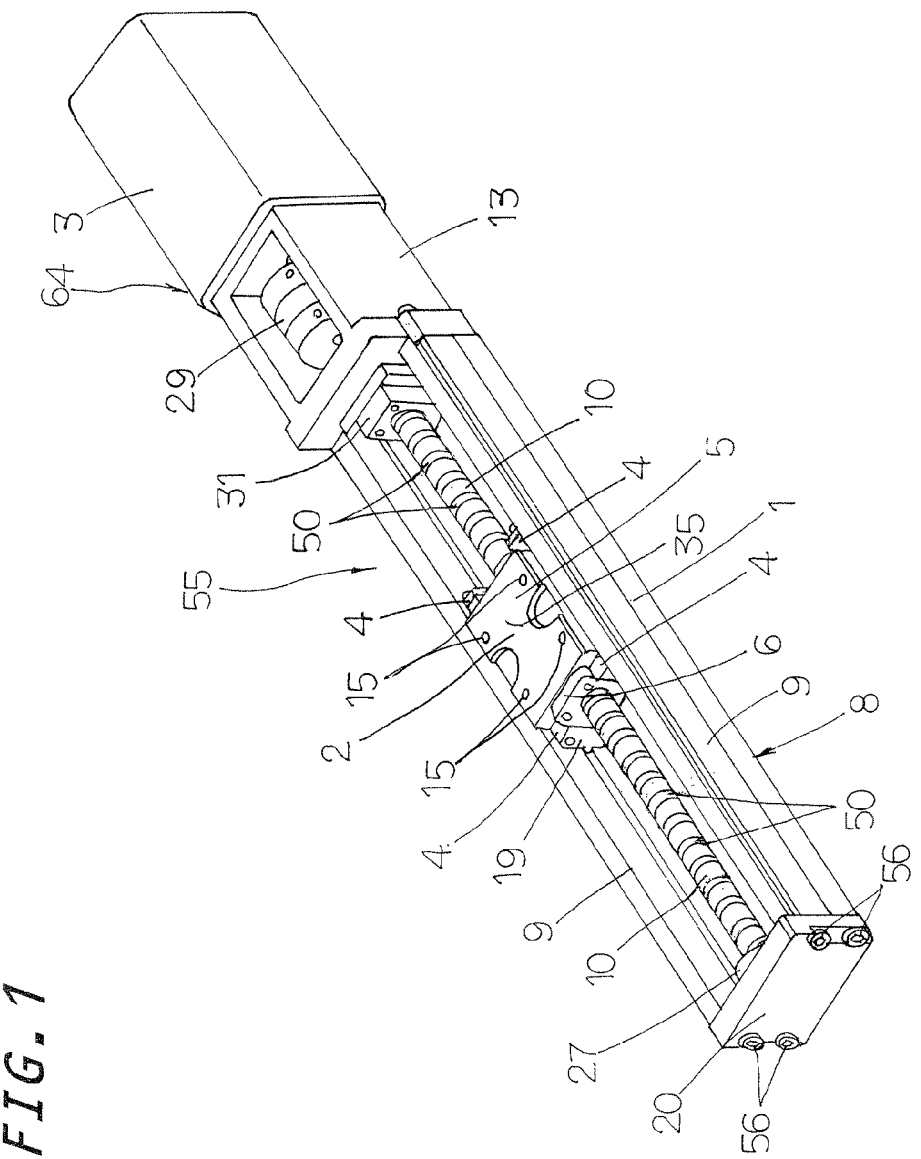
FIG. 1 is a view in perspective showing a preferred embodiment of an actuator according to the present invention.

Embodiments of the actuator of the present invention will be explained with reference to the accompanying drawings. The actuator constructed according to the present invention is well adapted for use in machinery as diverse as assembling machines, measurement instruments, processing machines, industrial robots, semiconductor manufacturing equipment, and so on.

The actuator 55, as generally shown in FIG. 1 to FIG. 4, is mainly composed of an elongated frame 1 to constitute a bed and a guide rail secured to a counterpart including a base, a machine bed and so on, a slider allowed to move relatively to the frame 1 in a lengthwise direction of the guide rail, and a driving unit 64 having a motor 3 to power the slider 2. The driving unit 64 is composed of a ball lead screw 65 including a lead screw 10 born for rotation at lengthwise opposite ends thereof by mean of bearings, not shown, in an end bracket 20 and a motor bracket 13, a lead nut 6 mating with the lead screw 10 through more than one ball 7B of rolling element and having a return tube 71 installed in the slider 2, and a motor 3 to energize the lead screw 10. The frame 1 has U-shape contour in transverse section composed of a bottom 8 and a pair of side walls 9 extending lengthwise from sidewise opposed edges of the bottom 8 to define the U-shape contour in transverse section. The bottom 8 of the frame 1 has threaded holes 14 spaced away from each other at regular intervals lengthwise of the frame 1, which are used to fasten the frame 1 to any base such as machine bed or the like. Moreover, the frame 1 and a major body 5 of the slider 2 are both made of extrusions of light alloy, which weigh less and cost less in production. First and second rail members 11 and 12 to be fastened to first lengthwise grooves that is a first recess 58 in the frame 1 and the slider major body 5, respectively, are made of steel alloy such as stainless steel and the like, which are drawn or pulled to the desired shape and worked to give high strength to raceway grooves 48 and 49 on the rail members 11 and 12.

Light-metal alloy including aluminum alloy and so on is extruded to form at once the frame 1 of U-shape in transverse section, which has the bottom 8 and a pair of upright side walls 9 extending lengthwise along widthwise opposite side edges of the bottom 8. Upon extruding operation, the frame 1 is made to have a unique contour including a first recess 58 to fit over the first rail member 11 and a groove 23 of T-shape lying on an outward surface of the upright side wall 9. Light-metal alloy including aluminum alloy and so on is extruded to form at once the slider major body 5, which has a contour having a second recess 59 extending lengthwise to fit over the second rail member 12, a cylindrical nut receiver 36 to accommodate the nut 6 in a cavity 63 made in one end surface 62 to mount the nut 6 to the slider major body 5, a through-hole 17 lying midway between sidewise opposite edges of the slider major body 5 to allow the lead screw 10 to extend lengthwise, and a cylindrical recess 18 of countersunk hole made around the through-hole 17 which will be described later. The nut 6, after accommodated in the cavity 63 of the slider major body 5, is retained in place by means of a flange 33 which has been put to an edge (that is end surface 62) of the slider major body 5 and secured to the slider major body 5 with fastening screws driven into threaded holes 67. The extrusion for the frame 1 is cut at every desired length and then made with threaded holes 14 and other threaded holes for parts while the extrusion for the slider major body 5 after separated at every preselected length is drilled with threaded holes 15 and other holes that are used to mount any parts thereon. The slider major body 5 further has a bore 16 to receive therein the sleeve 21 of porous compact serving as a return passage to allow the balls 7L of first rolling element running through there.

With the actuator constructed as stated earlier, the slider 2 as shown in FIG. 4 to FIG. 9 and FIG. 18 to FIG. 21 is generally composed of the slider major body 5, end caps 4 and balls 7L. More especially, the slider major body 5 has the second recesses 59 lying on widthwise opposite sides 66 to extend lengthwise in opposition to the first raceway grooves 48 on the frame 1 and the second rail members 12 fit into the second recesses 59. The end caps 4 are secured to the fore and aft ends (end surfaces 62) of the slider major body 5 by means of fastening screws 57 and provided therein with the turnaround passages 53 to communicate the return passages 22 with the load-carrying races 52 defined between the first raceway grooves 48 and the return passages. The balls 7L are allowed to rolling through circulating circuits 54 made up of the load-carrying races 52, return passages 22 and the turnaround passages 53. Moreover, the driving unit 64 has the ball lead screw 65 composed of the lead screw 10 born for rotation at lengthwise opposite ends thereof and lead nut 6 mating with the lead screw 10. The nut 6 is fastened in cylindrical nut receiver 36 in the cavity 63 made in one end surface 62 of the slider major body 5. The end cap 4 is composed of an end cap major part 60 having an outer circular half of the turnaround passage 53, and a spacer part 61 nested in a recess of the end cap major part 60 to provide an inner circular half of the turnaround passage 53. With the actuator 55 constructed as stated earlier, the cavity 63 of the cylindrical nut receiver 3 in the slider major body 5 is made larger in diameter than the through-hole 17 and an upper surface of the slider major part 5 has a mounting surface 35 to fasten the counterparts thereto.

Figure 2:
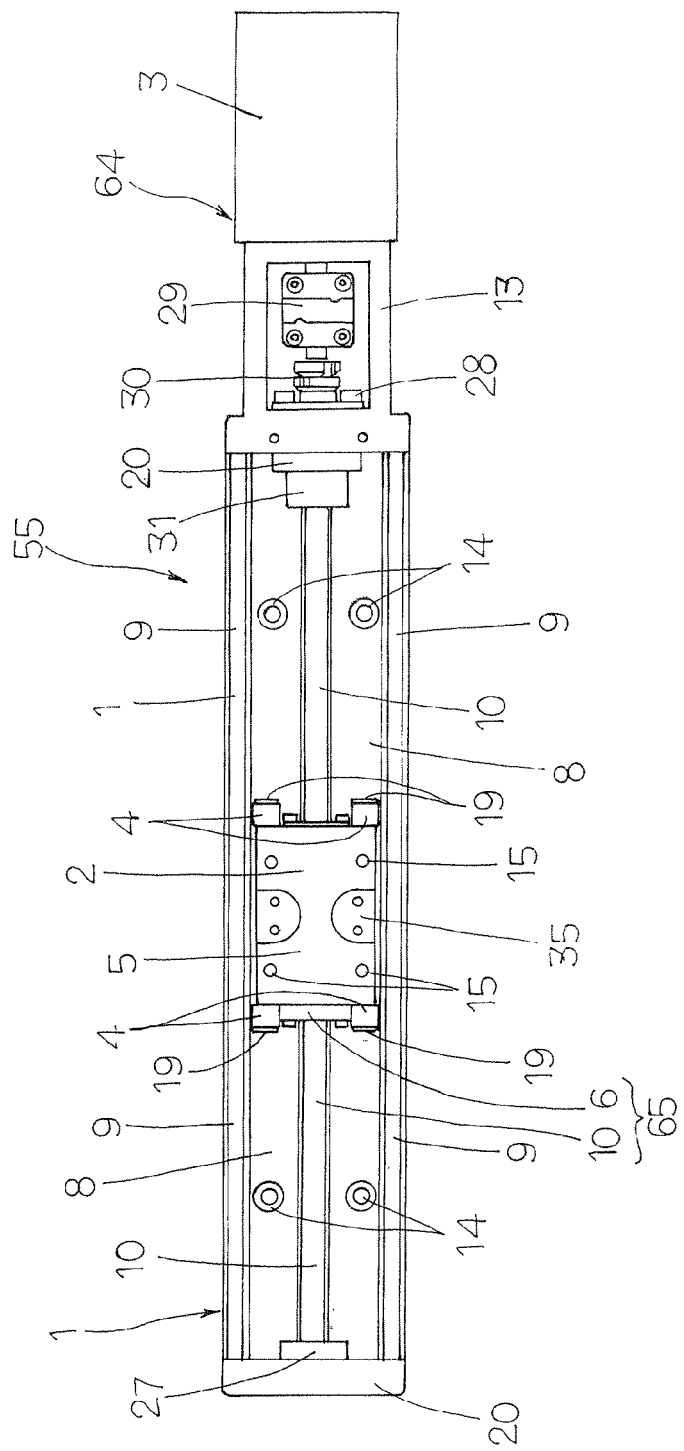
FIG. 2 is a view in plan of the actuator of FIG. 1.
Figure 3:
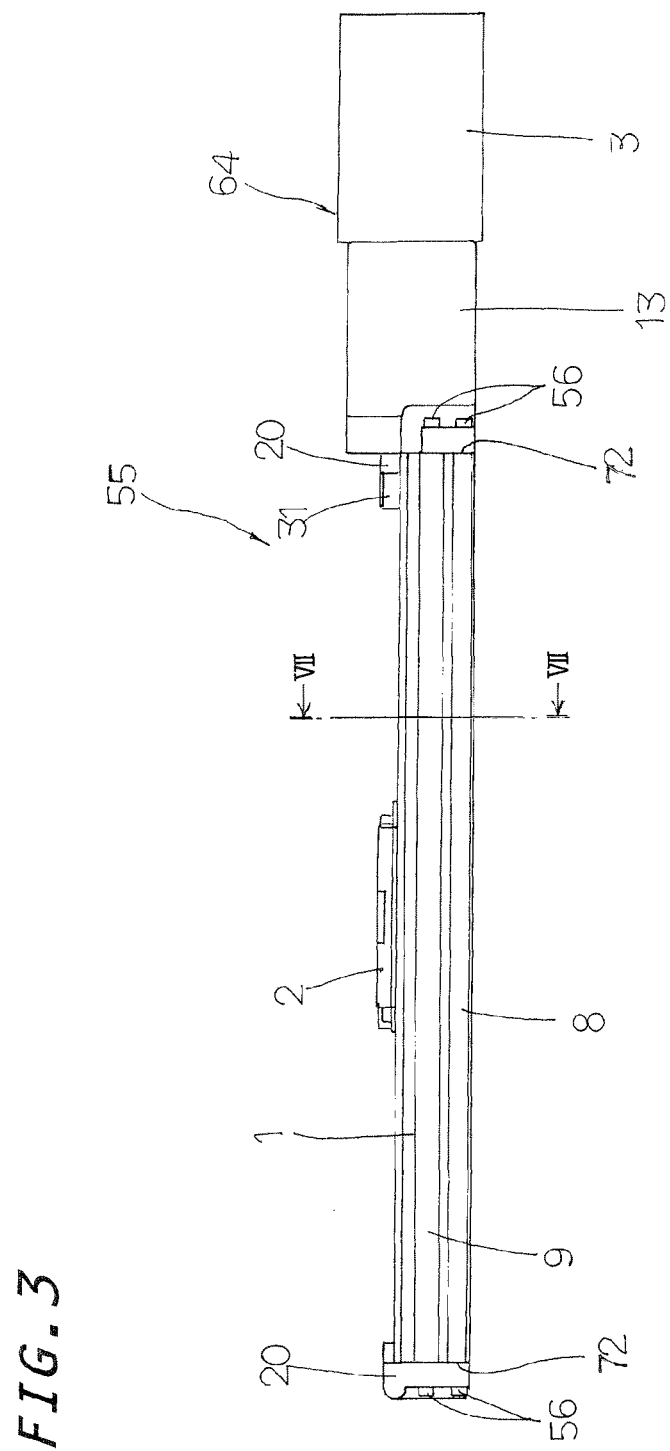
FIG. 3 is a view in side elevation of the actuator of FIG. 1.
Figure 4:
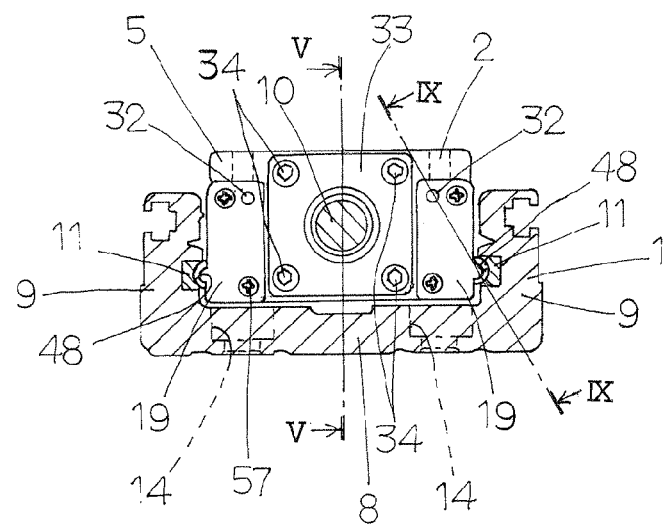
FIG. 4 is a view in front elevation of the actuator of FIG. 1.
Figure 5:
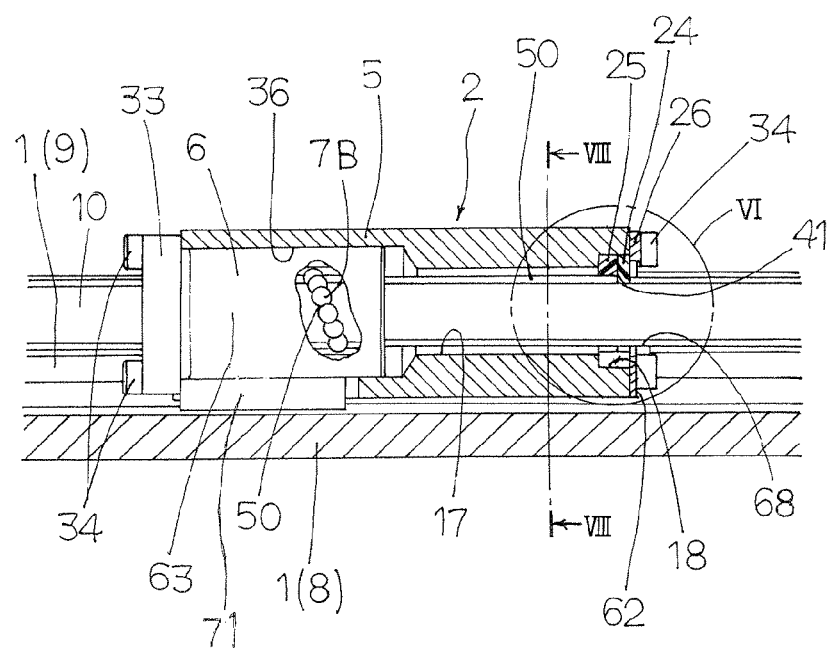
FIG. 5 is a fragmentary enlarged view in transverse section of the actuator of FIG. 4, the view being taken on the plane of the line V-V of FIG. 4 and an end cap being shown removed from slider.
Figure 6:
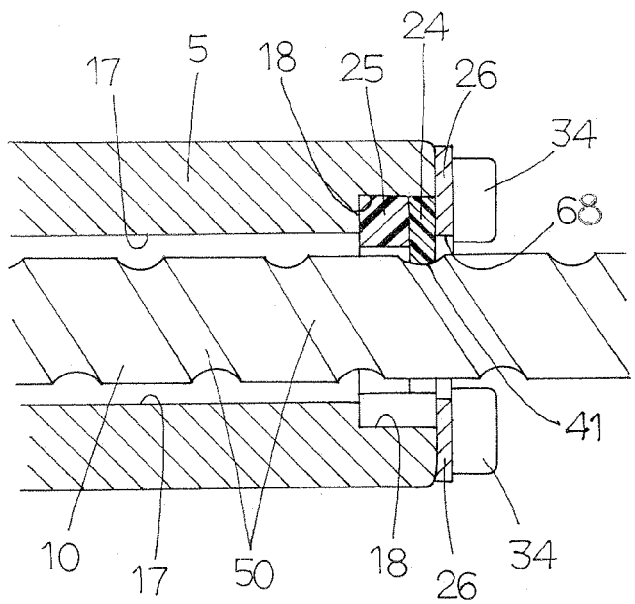
FIG. 6 is a fragmentary enlarged view showing in detail a location encircled with the sign VI of the actuator in FIG. 5.
Figure 7:
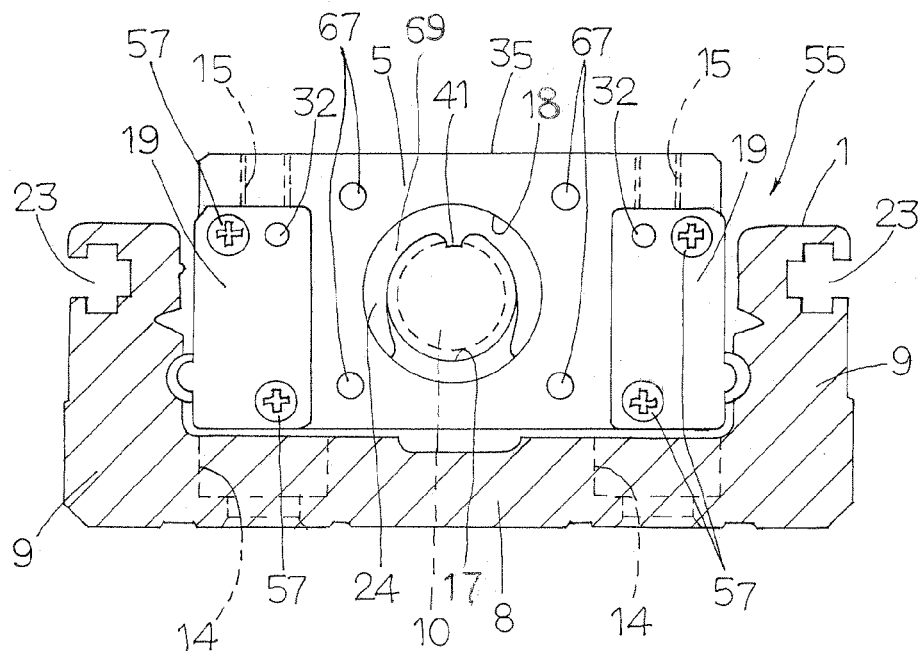
FIG. 7 is an enlarged view in transverse section of the actuator, the view being taken on the plane of the line VII-VII of FIG. 3, a presser plate being shown removed from the slider.
Figure 8:
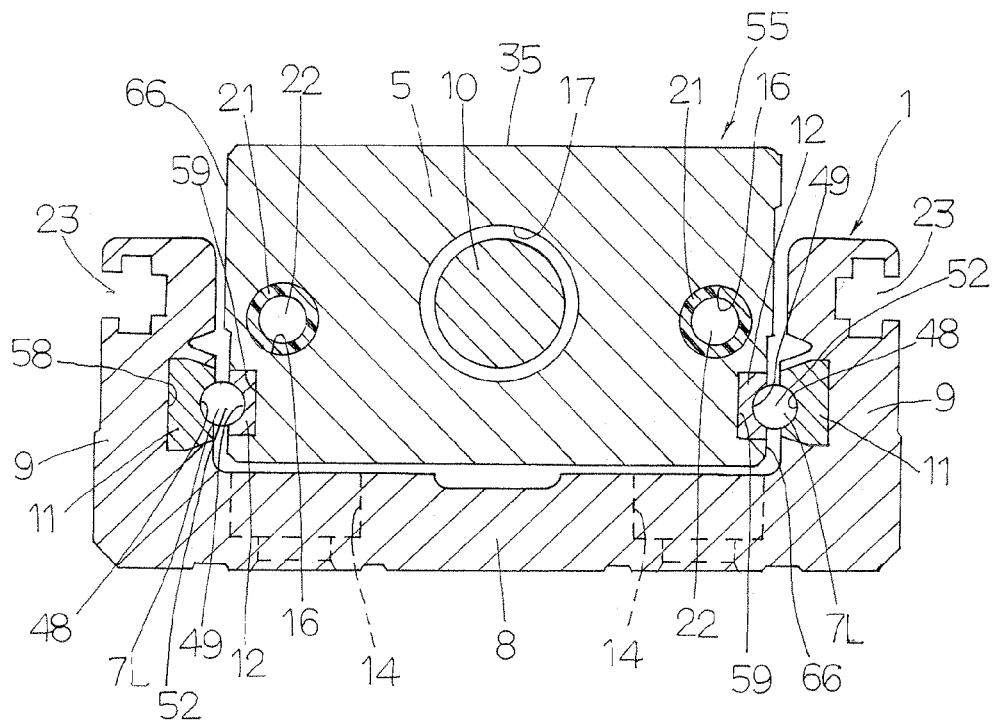
FIG. 8 is an enlarged view in transverse section of the actuator, the view being taken on the plane of the line VII-VII of FIG. 5.
Figure 9:
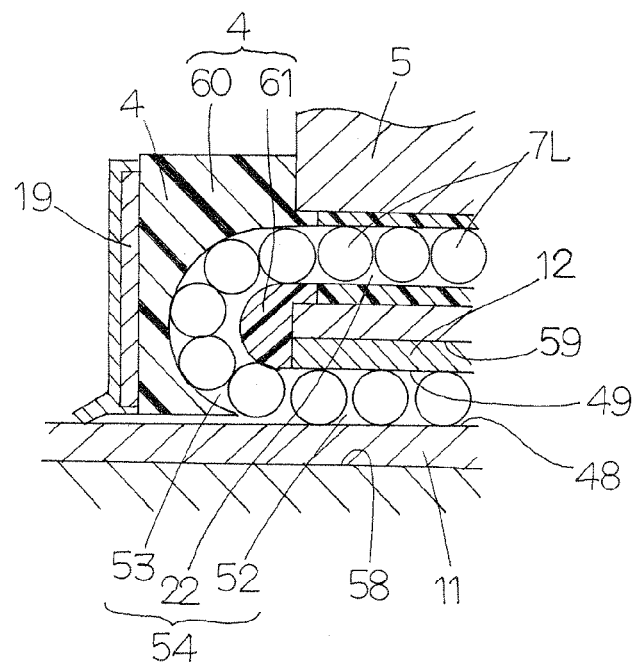
FIG. 9 is a fragmentary enlarged view in transverse section of the actuator, the view being taken on the plane of the line IX-IX of FIG. 4.
Figure 10:
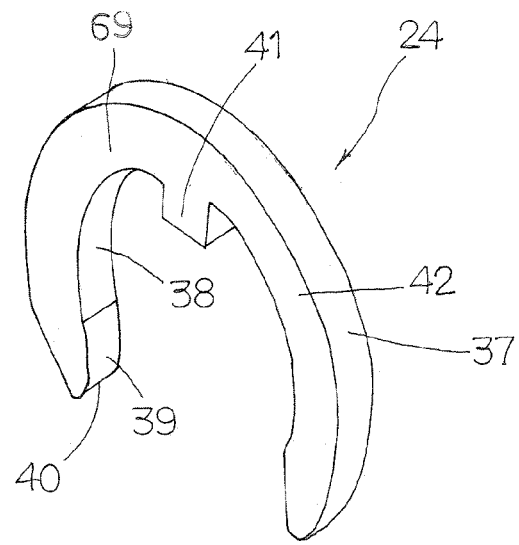
FIG. 10 is a view of perspective showing a first lubricating member to be installed in the actuator of FIG. 1.
Figure 11:
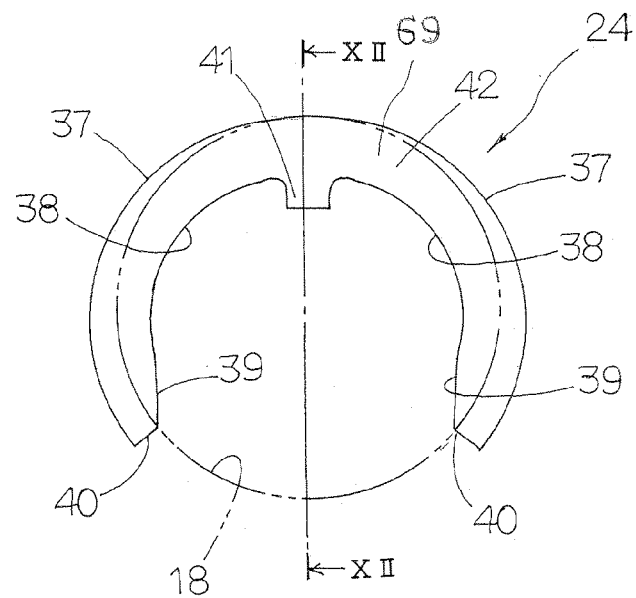
FIG. 11 is a view in front elevation showing the first lubricating member of FIG. 10.
Figure 12:
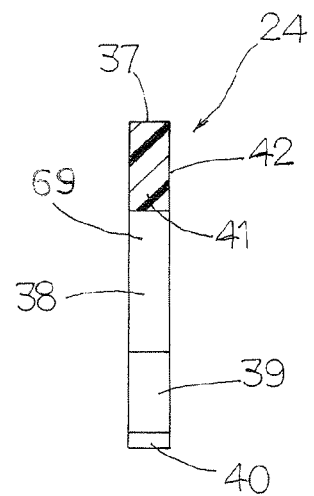
FIG. 12 is a view in transverse section of the actuator, the view being taken on the plane of the line XII-XII of FIG. 11.
Figure 13:
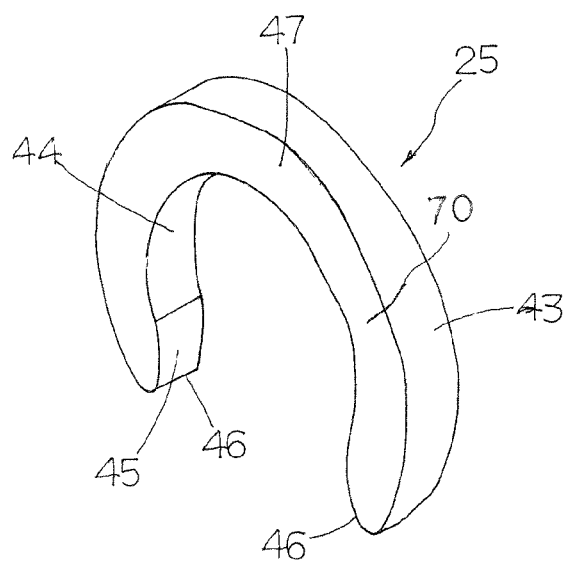
FIG. 13 is a view in perspective showing a second version of the lubricating member to be installed in the actuator of FIG. 1.
Figure 14:
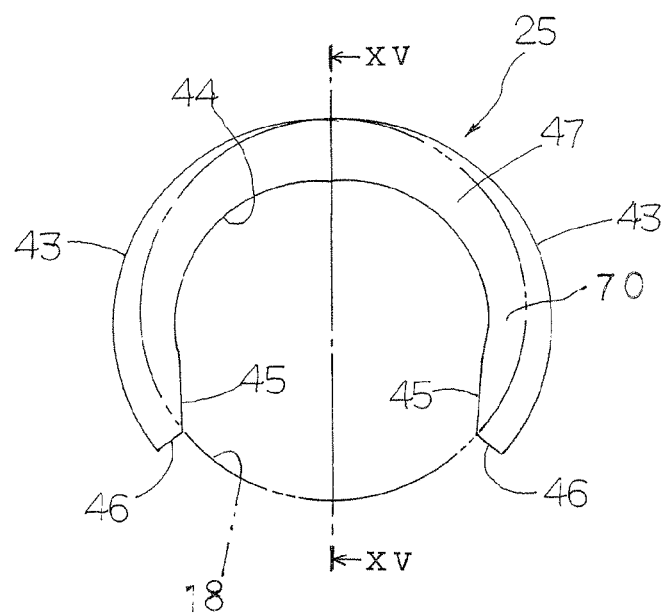
FIG. 14 is a view in front elevation showing the second version of the lubricating member of FIG. 13.
Figure 15:
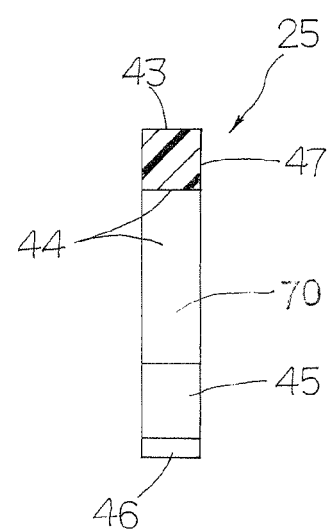
FIG. 15 is a view in transverse section of the second version of the lubricating member taken on the plane of the line XV-XV of FIG. 14.

The driving unit 64 has the motor 3 mounted on the bracket 13 fastened to the frame 1 or bed to drive the ball lead screw 10 which is born for rotation against the end bracket 20 which is installed at an end 72 of the frame 1. The motor 3 is to drive the ball lead screw 10 through a coupling 29 received in the bracket 13. The end bracket 20 is secured with screws 56 to an end of the frame 1 oppositely to the motor 3. Moreover, the bracket 20 has a stopper 27 to restrict a travelling range of the slider 2 having thereon the nut 6 which moves along the ball lead screw 10. A bearing retainer 28 is secured across from the motor 3 to the motor bracket 13 mounted to one end of the frame 1, and another bearing retainer 31 facing the slider 2 is secured to the motor bracket 13 through the end bracket 20. Bearings, not shown, to bear the ball lead screw 10 for rotation are secured at opposite sides thereof to the motor bracket 13 by means of the bearing retainers 28, 31. The motor bracket 13 has a bearing nut 30, besides the coupling 29. With the actuator 55 constructed as stated earlier, the first rail member 11 having the first lengthwise groove 48 fits into the first recesses 58 of dovetail shape on the side wall 9 of the frame 1 while the second rail member 12 having the second lengthwise groove 49 fits into the first recesses 58 on the side wall 9 of the frame 1. The end cap 4 as shown in FIGS. 2 and 4 are arranged in pairs to lay the ball lead screw 10 between them in such a way lying on the end 62 of the slider major body 5 sidewise separated from each other. End seals 19 are placed on the end caps 4, respectively. The end seals 19 have lubrication ports 32 in which a nozzle, not shown, may be coupled to resupply lubricant. Lubricant is resupplied from the lubrication port 32 in the end seal 19 into the turnaround passage 53, after having passed a lubricant path, not shown, in the end cap 4.

The actuator 55 of the present invention is envisaged lubricating the balls 7B of rolling element interposed between the lead screw 10 and the nut 6 of the ball lead screw 65. A first lubricating member 24 is built in the cylindrical recess 18 which is formed in an end of the slider major body 5 oppositely to the nut 6. The first lubricating member 24 has an applicator nose 41 which comes into sliding engagement with a helical groove 50 made on an outer circumferential surface 51 of the lead screw 10 to supply lubricant to the helical groove 50 to thereby lubricating the balls 7B of second rolling element. With the actuator constructed as stated earlier, the cylindrical recess 18 counterbored around the through-hole 17 at the end 62 of the slider major body 5 has stowed therein the first lubricating member 24 having the applicator nose 41 which comes into sliding engagement with the helical groove 50 around the lead screw 10 to supply lubricant to the helical groove 50, and a second lubricating member 25 to feed lubricant into the first lubricating member 24. The first lubricating member 24 impregnated with ample amount of lubricant makes close contact or engagement with the second lubricating member 25 on their opposite end surfaces 42 and 47. Thus, as the lubricant in the first lubricating member 24 is consumed, the lubricant retained in the second lubricating member 25 is fed to the first lubricating member 24. Both the first lubricating member 24 and the second lubricating member 25 are formed in a horseshoe shape or C-pattern configuration made open at 40, 46. Thus, major portions 69, 70 of the first lubricating member 24 and the second lubricating member 25 after having straddled the lead screw 10 undergo elastic deformation to make less or more an interval or space lying between cut edges 40, 46 of the lubricating member 24 or 25, whereby the lubricating member 24, 25 is mounted or demounted from the cylindrical recess 18 in the slider major body 5. The C-pattern configuration of the first lubricating member 24 and the second lubricating member 25, especially as shown in FIGS. 10 to 15, is designed to have outer circular surfaces 37, 43, inner circular upper surfaces 38, 44 and inner linear lower surfaces 39, 45 extending between the inner circular upper surfaces 38, 44 and the cut edges 40, 46. Thus, the first lubricating member 24 and the second lubricating member 25, when suffered to elastic deformation, are allowed to mount on or demount from the ball lead screw 10. With the embodiments recited here, though the lubricating member is made up of the first lubricating member 24 and the second lubricating member 25, more than two lubricating members are preferred to increase oily amount in the lubricant. As an alternative, it is preferred to control the thickness of the second lubricating member 25 to eliminate any boundary surface as far as possible. Moreover, a presser plate 26 at the middle thereof has an opening 68 for the ball lead screw 10.

With the actuator 55 constructed as stated earlier, the applicator nose 41 of the first lubricating member 24 has the thickness determined depending on the width of the helical groove 50 on the lead screw 10 while the second lubricating member 25 has the thickness which is greater than the first lubricating member 24 correspondingly the depth of the cylindrical recess 18 in the slider major body 5. The C-shaped major portion 69 of the first lubricating member 24 may be made different in thickness from the lubricant applicator nose 41. Otherwise, the C-shaped major portion 69 may be made grater in thickness than the lubricant applicator nose 41. With the actuator 55 of the present invention, the sleeve 21 inserted in the bore 16 in the slider major body 5, the first lubricating member 24 and the second lubricating member 25 are made of porous compact, which is made of fine powdery synthetic resinous material of polyethylene or polypropylene which is molded at elevated temperature while compacted into a porous or cellular structure in which the pores are open to each other through interstices among the fused particles, and lubricant retained in the pores or cells in the porous structure. Moreover, the ball lead screw 10 is arranged to extend through the through-hole 17 made at the center of the slider major body 5. The cylindrical recess 18 is counterbored around the through-hole 17 at the end 62 of the slider major body 5. The second lubricating member 25 is placed in the depth of the cylindrical recess 18 and the first lubricating member 24 is placed in close contact with the second lubricating member 25 so that lubricant is allowed to transfer with smooth from the second lubricating member 25 to the first lubricating member 24. Thus, the lubricant impregnated in the sleeve 21 and the first lubricating member 24 is adequately supplied through the balls 7L making rolling contact with the sleeve 21 and further through the helical groove 50 around the ball lead screw 10 making contact or engagement with the applicator nose 41 of the first lubricating member 24 to thereby lubricate the balls 7L. The construction in which the first lubricating member 24 is placed nearer to the open edge of the cylindrical recess 18 in the slider major body 5 makes it easier to carry out assembly procedures and to confirm whether the applicator nose 41 makes securely engagement with the helical groove 50 of the ball lead screw 10. With the actuator 55 constructed as stated earlier, the slider 2 may get rid of the restriction in stroke length of the slider 2 because the first lubricating member 24 and the second lubricating member 25 are built in the slider major body 5. Moreover, as the first lubricating member 24 and the second lubricating member 25 may be suffered the elastic deformation in shape so as to straddle the ball lead screw 10, the interval or spacer lying between cut edges 40, 46 may be made as less as possible. Thus, the more the overall volume of the first lubricating member 24 and the second lubricating member 25, the greater will be the amount of lubricant impregnated in the lubricating members.

Figure 16:
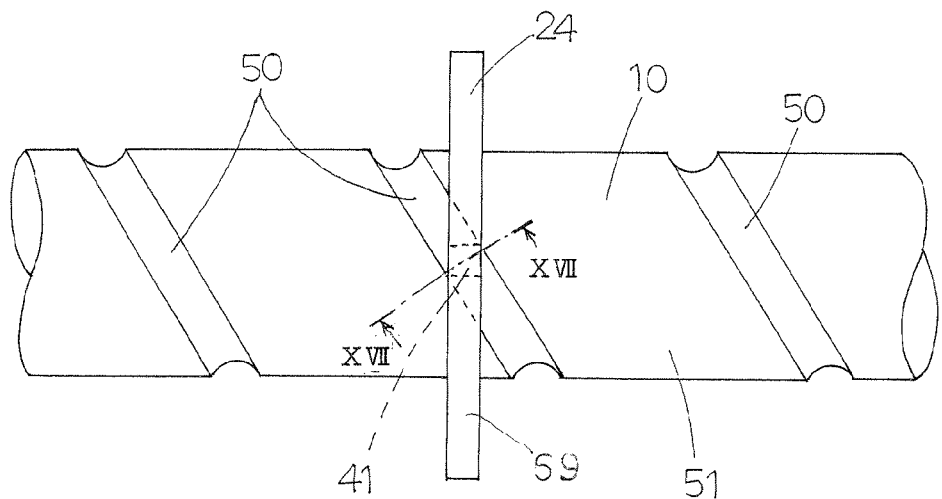
FIG. 16 is a view explanatory of how an applicator nose of a first lubricating member of FIG. 10 comes into sliding contact with a helical groove around a lead screw.
Figure 17:
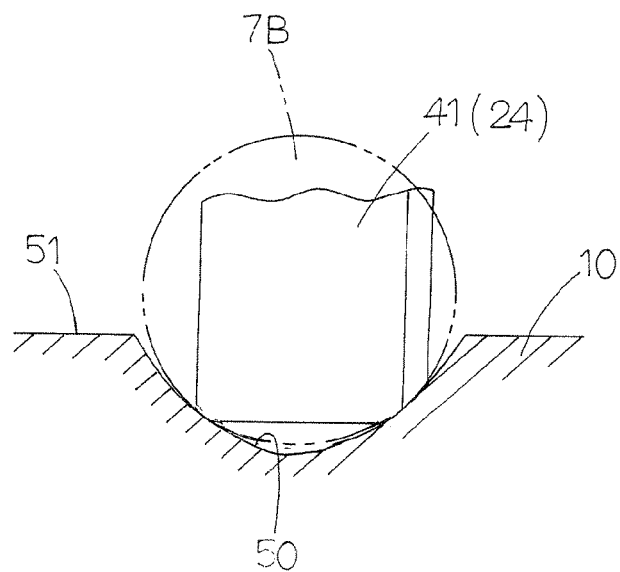
FIG. 17 is a view taken on the line XVII-XVII of FIG. 16 to explain how the applicator nose of the first lubricating member comes into sliding contact with the helical groove of the lead screw in relation to a second ball of rolling element installed in the ball screw set.
Figure 18:
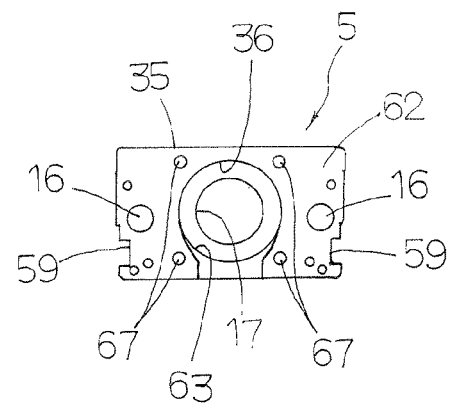
FIG. 18 is a view in front elevation of the slider in the actuator of FIG. 1.
Figure 19:
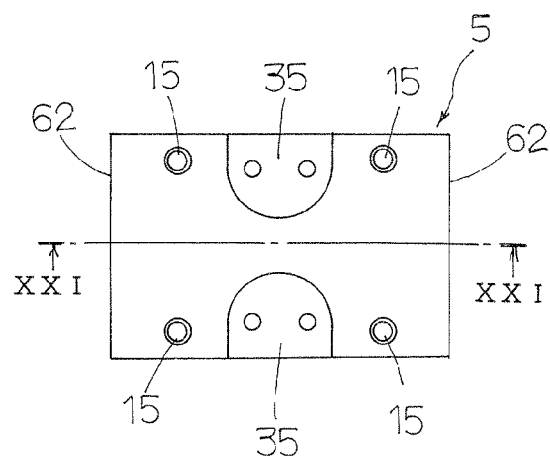
FIG. 19 is a view in plan of the slider of FIG. 18.
Figure 20:
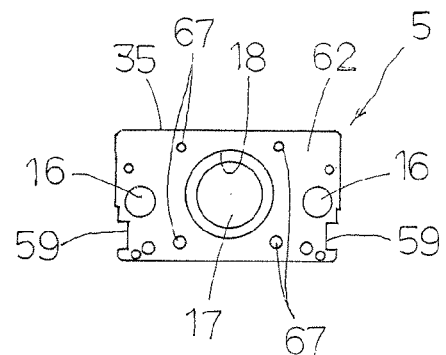
FIG. 20 is a view in rear elevation of the slider of FIG. 19.
Figure 21:
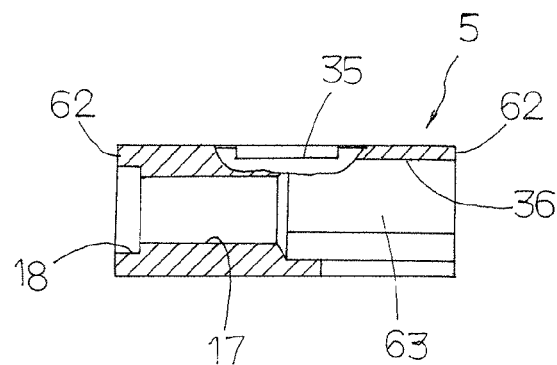
FIG. 21 is a view in transverse section of the slider taken on the line XXI-XXI of FIG. 19.
Figure 22:
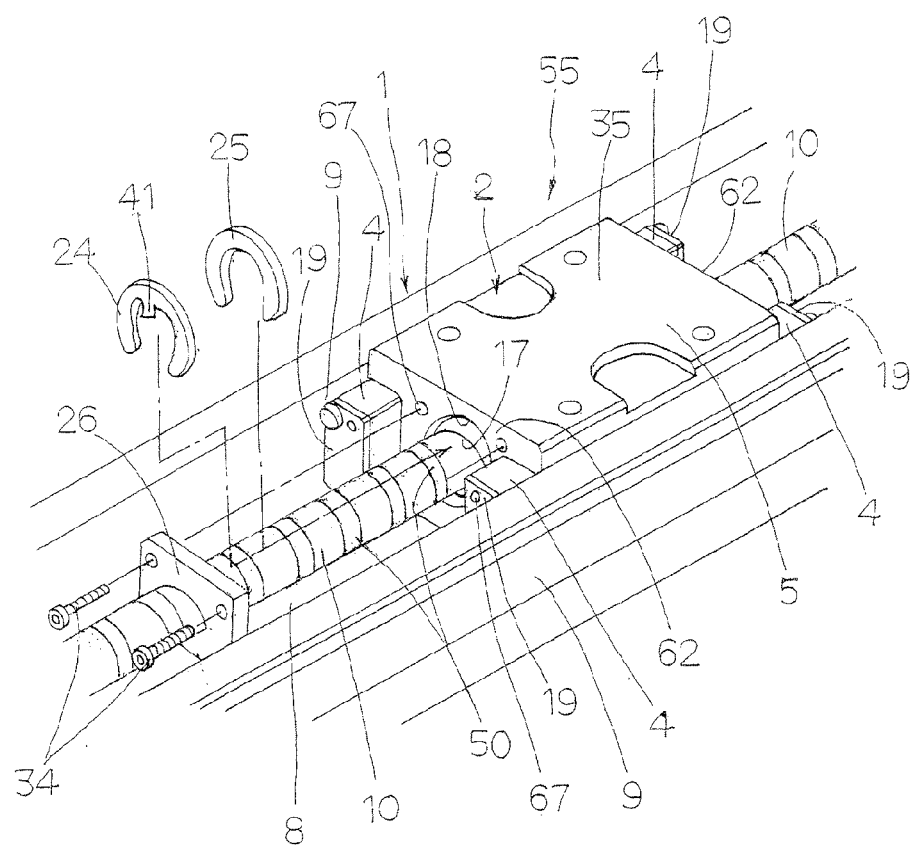
FIG. 22 is a view in perspective of the actuator of FIG. 1 to explain steps to install the first and second lubricating members into the slider arranged in an elongated frame.
Figure 23:
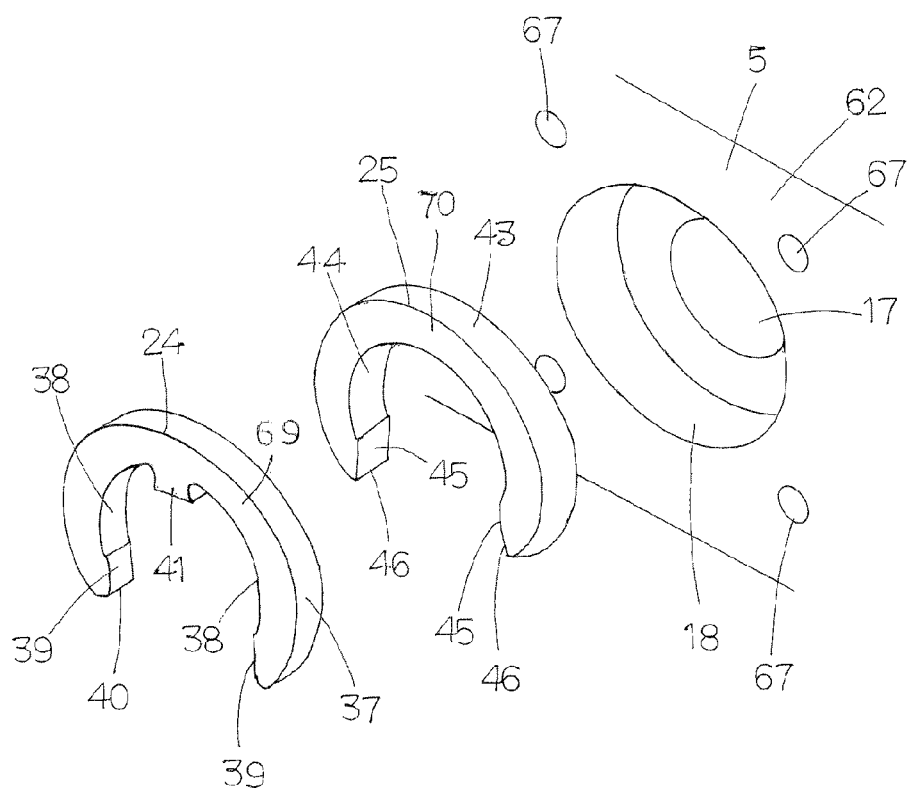
FIG. 23 is an enlarged view in perspective explaining steps to install the first and second lubricating members into a recess made on an end surface of the slider of FIG. 22.

With the actuator 55 constructed as stated earlier, the first lubricating member 24 and the second lubricating member 25, before suffered to elastic deformation to put them in the cylindrical recess 18 in the slider major body 5, each have the outer diameter of, for example, around 6.9 mm. The first lubricating member 24 and the second lubricating member 25, before suffered to elastic deformation, have the radius R of, for example, around 4.9 mm. In light of the helical groove 50 of the ball lead screw 10 and the size of the applicator nose 41 to fit into the helical groove 50, the first lubricating member 24 as shown in FIG. 16 and FIG. 17 has the thickness of around 1.4 mm and the thickness of the second lubricating member 25 is determined about 2 mm which is larger than the thickness of the first lubricating member 24 for the purpose of increasing the amount of impregnated lubricant. The applicator nose 41 of the first lubricating member 24 extends from the inner circular surface 38 towards the helical groove 50 around the ball lead screw 10 to provide a raised portion of around quadrilateral having the width of, for example 1.4 mm equal to the thickness of the first lubricating member 24. Moreover, the interval or space lying between the lower cut edges 40, 46 of the lubricating member 24 or 25 is made across about 103° in consideration of straddling the ball lead screw 10. The applicator nose 41 of the first lubricating member 24, as shown in FIG. 17, makes it easier to make the contact or engagement with the helical groove 50 to apply lubricant there. It will be thus understood that the lubricating member 24 at diagonal locations thereof comes into R-grooved surface of the helical groove 50 on the ball lead screw 10. More especially, the diagonal locations of the applicator nose 41 make contact with line contact or surface contact with the curved surface of the helical groove 50 to make better application of lubricant from the first lubricating member 24 to the helical groove 50.

The actuator 55 has, for example the width of 50 mm and the height of 26 mm. The first lubricating member 24 and the second lubricating member 25 is designed to be built in the cylindrical recess 18 in the slider major body 5 of the slider 2 having block contour which is low in height and narrow in width. With the actuator 55 constructed as stated earlier, though the frame 1 and the slider major body 5 is made of aluminum which is easy to make the extrusions, these aluminum extrusions are usually short of mechanical strength. To cope with this shortage in strength, the first guide rails 11 are installed in the lengthwise recess that is a second recess 59 cut in the side walls 9 of the frame 1 and further the second guide rails 12 are set in the recesses 59 lying on widthwise opposite sides 66 of the slider major body 5. The slider 2 is driven by the driving unit composed of the ball lead screw 65 and the motor 3 to move smoothly along the first guide rail 11 by means of the balls 7L of rolling element. The slider major body 5 and the frame 1 are subjected to, for example black alumite (anodic oxidation coating on aluminum) treatment. The lead screw 10 for the ball lead screw 65 has, for example φ8 mm and the lead of the lead screw 10 is made, for example any one of 4 mm and 8 mm.

The cylindrical recess 18 in the slider major body 5 of the slider 2 is made in a circular recess of, for example φ13 mm in outer diameter and 3.5 mm in depth to make it possible to suffer the second lubricating member 25 to experience elastic deformation. The elastic deformation of the first lubricating member 24 and the second lubricating member 25 is carried out by collapse of the cut edges 40, 46 towards each other. The outer circular surfaces 37, 43 are allowed to come into close fit inside the cylindrical recess 18. With the actuator 55 constructed as stated earlier, it is preferred that the second lubricating member 25 is placed deep into the cylindrical recess 18 and the first lubricating member 24 is placed near the opening edge of the cylindrical recess 18. More especially, the applicator nose 41 of the first lubricating member 24 is kept in alignment with the helical groove 50 of the ball lead screw 10 to make sure of certain contact or engagement of the applicator nose 41 with the helical groove 50 of the ball lead screw 10. Then, the applicator nose 41 is certainly mounted to the slider major body 5 with the presser plate 26 which is fastened to the slider major body 5 by means of fastening screws 34.

The actuator 55 of the present invention has various sensors, not shown, which are fastened to the outer surfaces of the side wall 9 of the frame 1. The first lubricating member 24 and the second lubricating member 25 may be made in O-ring contour cut off at only one location thereof. The lubricating member of O-ring contour constructed as stated just earlier, after having suffered elastic deformation to space out the cut edges 40, 40 from each other, may straddle the ball lead screw 10 to fit around the ball lead screw 10. The way of assembling the first lubricating member 24 and the second lubricating member 25 with the ball lead screw 10 is unspecified. Although not shown, the first lubricating member 24 and the second lubricating member 25 may be installed directly in the cylindrical recess 18 of the slider major body 5. Moreover, any upper seal, not shown, may be arranged to seal a clearance between the side walls 9 of the frame 1 and the slider 2. In addition, although not shown, the cylindrical recess 18 and the cylindrical nut receiver 36 to accommodate the nut 6 of the ball lead screw 65 may be reversed in their locations. This version means that the nut 6 is located on the side of motor 3 and the first lubricating member 24 and the second lubricating member 25 are arranged on the side opposite to the motor 3.

What is claimed is:

1. An actuator comprising: an elongated frame of U-shape in transverse section defined with a bottom and a pair of side walls extending along widthwise opposing edges of the bottom, a slider lying between the side walls of the elongated frame configured to move lengthwise of the side walls by more than one ball of first rolling element, and a driving unit to move the slider relatively to the frame, wherein the slider is composed of a slider major body having second raceway grooves lying on widthwise opposite sides of the slider major body to extend lengthwise of the slider major body and bores extending in parallel with the second raceway grooves, end caps secured to fore and aft ends of the slider major body, the end caps each having turnaround passages connecting return passages with load-carrying races each of which is defined between each respective first raceway groove and each respective second raceway groove, so that more than one first rolling element is allowed to roll through a circulating circuit made up of the load-carrying race, return passage and the turnaround passages, wherein the driving unit has a ball screw composed of a ball lead screw round in transverse section and a nut mating with the ball lead screw through second balls, wherein the ball lead screw extends through a though-hole lying midway between sidewise opposite edges of the slider major body, wherein the nut is secured to a cavity of a cylindrical nut receiver formed at a first end of the through-hole of the slider major body, wherein a first lubricating member and a second lubricating member are installed in a cylindrical recess formed at a second end of the through-hole, the first lubricating member having an applicator nose coming into sliding contact with a helical groove of the ball lead screw and the second lubricating member supplying the lubricant to the first lubricating member, the first lubricating member has a thickness determined depending on a width of the helical groove on the lead screw and the second lubricating member has a thickness which is greater than the first lubricating member and, correspondingly, greater than a depth of the cylindrical recess in the slider major body, wherein the first lubricating member and the second lubricating member are secured in the cylindrical recess by a presser plate secured to an edge surface of the slider major body by fastening screws, wherein a sleeve is inserted in the bores in the slider major body, and the sleeve, the first lubricating member and the second lubricating member are made of porous compact, which is made of fine powdery synthetic resinous material of polyethylene or polypropylene which is molded at elevated temperature while compacted into a porous or cellular structure in which the pores are open to each other through interstices among the fused particles, and lubricant retained in the pores or cells in the porous structure, and wherein the cavity of the cylindrical nut receiver formed in the slider major body is made larger in diameter than the through-hole and an upper surface of the slider major part has a mounting surface to fasten the counterparts thereto.

2. The actuator constructed as defined in claim 1 wherein the first lubricating member and the second lubricating member have a C-shaped contour cut off at lower locations, so that the first lubricating member and the second lubricating member after having straddled the lead screw undergo elastic deformation to make less or more an interval or space lying between cut edges of the lubricating member, whereby the lubricating member is mounted or demounted from the cylindrical recess in the slider major body, and wherein the C-shaped contour of the first lubricating member and the second lubricating member is designed to have outer circular surfaces, inner circular upper surfaces and inner linear lower surfaces extending between the inner circular upper surfaces and lower cut edges, and wherein the first lubricating member and the second lubricating member, when suffered to elastic deformation, are allowed to mount on or demount from the ball lead screw.

3. The actuator constructed as defined in claim 1 wherein the driving unit has a motor mounted on a motor bracket fastened to the frame or bed to drive the ball lead screw, the motor rotating the ball lead screw through a coupling received in the motor bracket, and wherein the ball lead screw is supported for rotation by means of an end bracket of the frame.

4. The actuator constructed as defined in claim 1 wherein the side walls of the frame have first recesses of dovetail configuration extending lengthwise of the frame to fit over first rail members having first raceway grooves and widthwise opposite sides of the slider major body have second recesses to fit over second rail members having second raceway grooves.

5. The actuator constructed as defined in claim 1 wherein the end caps are arranged in pairs to lay the ball lead screw between the end caps in such a way lying on the end of the slider major body sidewise separated from each other and end seals are placed on the end caps, and wherein the end seals have lubrication ports.

* * * * *